United States Patent [19]

Muilwijk

[11] 4,438,524
[45] Mar. 20, 1984

[54] RECEIVER FOR ANGLE-MODULATED CARRIER SIGNALS

[75] Inventor: Dirk Muilwijk, Hilversum, Netherlands

[73] Assignee: U.S. Philips Corporation, New York, N.Y.

[21] Appl. No.: 375,597

[22] Filed: May 6, 1982

[30] Foreign Application Priority Data

May 27, 1981 [NL] Netherlands .......................... 8102595

[51] Int. Cl.³ ............................................ H04L 27/18
[52] U.S. Cl. ........................................ 375/80; 375/85; 329/112
[58] Field of Search ........................ 375/52, 53, 57, 83, 375/85, 90, 80; 329/110, 112, 118; 455/205

[56] References Cited

U.S. PATENT DOCUMENTS

| 3,535,452 | 10/1970 | Oswald .................................. 375/85 |
| 3,674,934 | 7/1972 | Gooding et al. ....................... 375/90 |
| 4,035,767 | 7/1977 | Chen et al. ............................. 375/56 |
| 4,320,499 | 3/1982 | Muilwijk et al. ...................... 375/85 |

*Primary Examiner*—Robert L. Griffin
*Assistant Examiner*—Stephen Chin
*Attorney, Agent, or Firm*—Thomas A. Briody; William J. Streeter; Edward W. Goodman

[57] ABSTRACT

In mobile radio communication it often happens that the received signal disappears owing to, for example, fading. If a receiver is used which is based on the coherent detection principle, acquisition of the carrier must consequently be done repeatedly. In order to avoid the loss of information resulting therefrom, non-coherent detection is used in the receiver for angle-modulated carrier signals in combination with a decision criterion which is based on the possible phase trajectories of the demodulated signal.

3 Claims, 4 Drawing Figures

RECEIVER FOR ANGLE-MODULATED CARRIER SIGNALS

BACKGROUND OF THE INVENTION

The invention relates to a receiver for angle-modulated carrier signals, particularly of the tamed FM-type, the receiver comprising an input circuit for deriving the transmitted angle-modulated carrier signal from a transmission channel, a reference carrier circuit, a demodulation circuit coupled to the input circuit for demodulating the transmitted angle-modulated carrier signal with the reference carriers for generating first and second demodulated signals, the receiver further comprising a decision circuit to obtain regenerated binary data signals from the first and second demodulated signals.

In radio communication systems, use is preferably made of modulation methods which result in a modulated carrier signal of a (substantially) constant amplitude (envelope), which means the use of angle modulation. See, for example, F. de Jager, C. B. Dekker, IEEE Trans, Comm., Vol. CDM-26, No. 5, May 1978, pages 534-542 for the use of "tamed FM" (TFM) for that purpose. It has been found that a receiver for TFM signals has an advantageous signal-to-noise ratio versus the error rate performance (expressed in BER: bit error rate) if use is made of coherent demodulation.

Specifically, in mobile radio communication it often occurs that the received signal disappears as a result of, for example, fading. The circuit in the receiver in which the carrier required for coherent detection is regenerated, has a certain acquisition time: correct reception is not possible until approximately 50 bits have been received. After each fade, acquisition will be required again which results in loss of information. In secrecy radio communication systems "frequency hopping" is frequently used: during the communication the carrier frequency is changed in order to hinder unwanted overhearing. Also in that case, after adjusting to a different carrier frequency, loss of information will occur owing to the renewed acquisition.

SUMMARY OF THE INVENTION

The invention has for its object to provide a receiver of the type described in the opening paragraph, which does not have the disadvantages.

According to the invention, the receiver for binary data signals is characterized in that the reference carrier circuit in the receiver comprises a carrier oscillator, the frequency of which is approximately equal to the frequency of the carrier oscillator of the modulation stage of the transmitter, that the decision circuit in the receiver determines the phase difference between the end of a period which is two symbol intervals long and has a length 2T and the beginning of a period which is two symbol intervals long and has a length of 2T, that the decision circuit is arranged for generating a first logic value if the phase difference exceeds a decision threshold and for generating a second logic value if the phase difference falls short of said decision threshold, that the decision threshold for the interval which has a length of two symbol intervals and follows after the instantaneous interval having a length of two symbol intervals is equal to $(\pi/2)$ rad. if the first logic value is regenerated in the instantaneous interval, that the decision threshold for the next interval is equal to $(\pi/4)$ rad. if the second logic value is generated in the instantaneous interval and in the last interval in which a first logic value was generated the phase difference was positive (negative) and the number of symbol intervals between said interval and the instantaneous interval is even (odd) and that the decision threshold for the next interval is equal to $-(\pi/4)$ rad. for the remaining cases.

The invention and its advantages will now be further described by way of non-limitative example with reference to the accompanying drawings in which corresponding elements are given the same reference numerals.

DESCRIPTION OF THE PREFERRED EMBODIMENT

Figure 1:
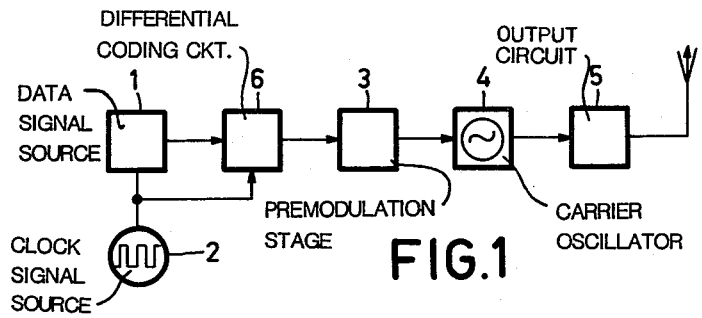
FIG. 1 is a block schematic circuit diagram of a prior art transmitter for binary data signals.

FIG. 1 shows a block schematic circuit diagram of a transmitter for transmitting binary data signals to a receiver through a radio transmission channel. This transmitter, which is known per se, comprises a data signal source 1 which is synchronized by clock signal source 2. The binary data signal derived from source 1 with a symbol rate 1/T is applied to a premodulation circuit 3, the output of which is connected to a carrier oscillator 4 for generating an angle-modulated carrier signal having a substantially constant amplitude and a continuous phase. Said modulated signal is applied to the transmission channel via an output circuit 5 in which, if necessary, power amplification and conversion to the required radio frequency band is effected. To simplify the recovery of the reference carriers in the receiver let it further be assumed that the binary data signals in the transmitter are differentially coded by means of a differential coding circuit 6 which is controlled by clock signal source 2.

Figure 2:
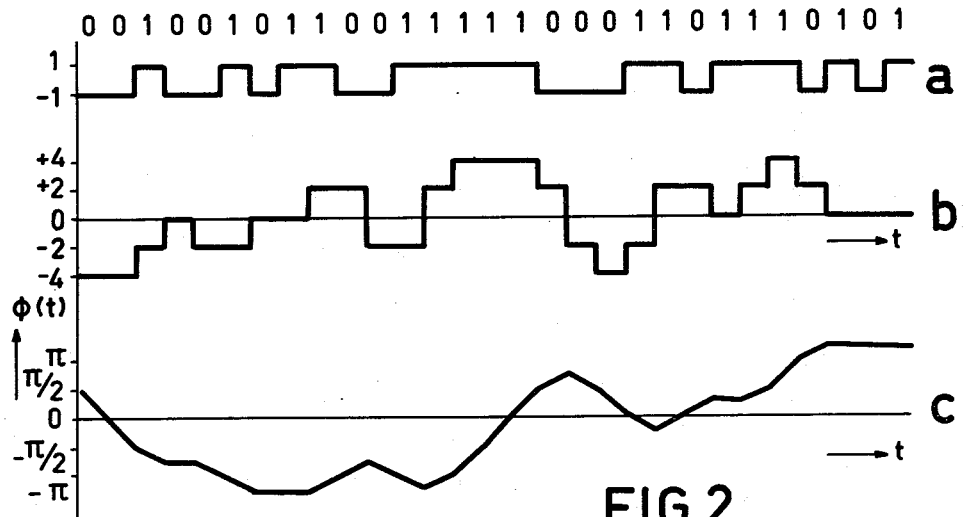
FIG. 2 shows some signal shapes which occur in the transmitter shown in FIG. 1.

As mentioned in the foregoing, the premodulation circuit 3 is arranged for generating an angle-modulated carrier signal of a substantially constant amplitude. For that purpose, in the following examples of tamed FM, the continuous phase $\phi(t)$ of the angle-modulated carrier signal in each symbol interval having a length T is changed by an amount, expressed in radians, from the range $-(\pi/2)$, $-(\pi/4)$, 0, $(\pi/4)$ and $(\pi/2$ radians. The amount of the relevant symbol interval is determined by those consecutive data symbols. The shape of the phase $\phi(t)$ for instant t within the relevant symbol interval is determined by a filtered version of said three consecutive data symbols. This will be further described with reference to FIG. 2. FIG. 2a shows an example of the binary data signals derived from data signal source 1. FIG. 2b shows how data signals shown in FIG. 2a can be correlatively coded over three symbol intervals. The starting point was a coding of the data signals whereby the new bit value S(0) is obtained from the sum of the instantaneous bit value S(0), twice the preceding bit value $2S_a(-T)$ and the bit value $S_a(-2T)$, preceding the previous one, so the bit value which is delayed by two symbol intervals. Consequently, this correlative coding results in a five level or pentavalent data signal. FIG. 2c shows, somewhat schematically, how the continuous phase $\phi(t)$ is obtained from the precoded data signals shown in FIG. 2b. For further details, which are however not necessary for understanding the invention, reference is made to the article by F. de Jager and C. B. Dekker, published in IEEE Trans. Comm. Vol. CDM 26, No. 5, May 1978, pp. 334–542. FIG. 7 of said publication shows the impulse response of the premodulation circuit 3 described in the foregoing.

It should be noted that the receiver described hereafter is not only suitable for receiving angle-modulated signals of the described, tamed FM-type but that premodulation circuit 3 may alternatively be arranged for providing an impulse response of the Gaussian type or of the raised-cosine type. Particularly from the publication in the Proceedings of the 29th IEEE Vehicular Technology Conference, Arlington, Illinois, U.S.A., Mar. 27–30, 1979, page 13–9, this appears to be the case if the premodulated circuit is a Gaussian low-pass filter having a standardized bandwidth BT of 0.19.

The above-mentioned article also describes how a receiver may be arranged in order to recover the original binary data signal by means of coherent detection. The circuit in the receiver in which the carrier required for coherent detection is regenerated has a certain acquisition time: correct reception is not possible until after approximately 50 bits have been received. Said acquisition time also occurs in the case when the reception of a signal is seriously affected by fading, which often occurs in mobile radio communication. Also in uses where "frequency hopping" is employed, a new acquisition will be necessary.

Figure 3:
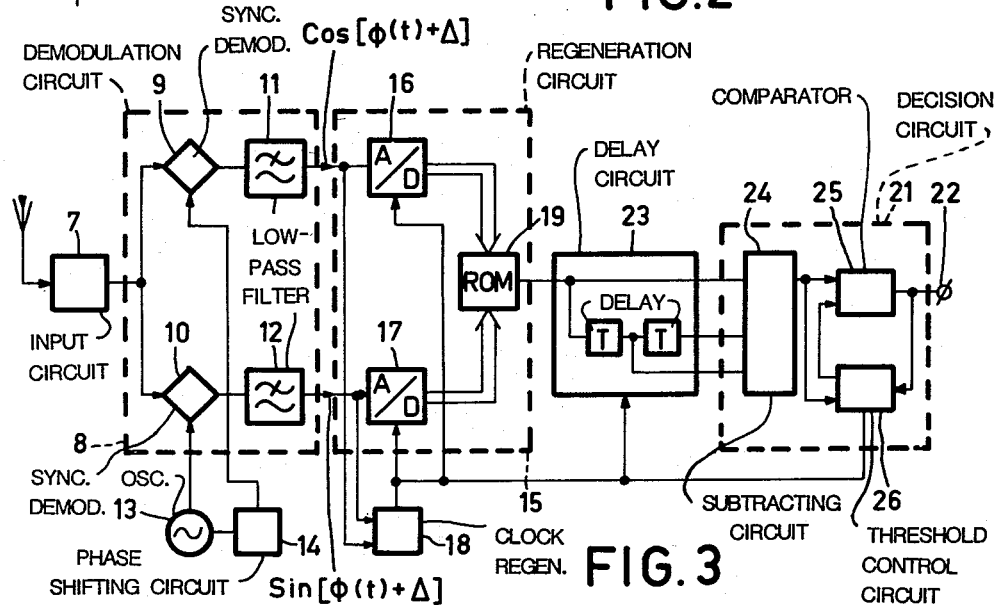
FIG. 3 shows an embodiment of a receiver for binary data signals in accordance with the invention.

FIG. 3 shows a receiver for non-coherent reception in which these drawbacks are avoided. In this receiver the modulated signal is derived from the transmission channel by means of an input circuit 7 in which, if necessary, amplification and conversion to the original frequency band is effected. The transmitted modulated signal is applied to an orthogonal demodulation circuit 8 comprising two synchronous demodulators 9, 10 having low-pass filters 11, 12 connected thereto. These demodulators 9, 10 are supplied by two reference carriers having a phase difference of $(\pi/2)$rad. For that purpose the receiver comprises an oscillator 13 which supplies demodulator 10 directly and demodulator 9 via a phase shifting circuit 14. Oscillator 13 is a free-running oscillator the frequency f of which will therefore generally deviate from the carrier frequency $f_m$. Consequently $f = f_m + \Delta f$, wherein $\Delta f$ will generally differ from zero.

Two demodulated signals $\cos[\phi(t)+\Delta]$, $\sin[\phi(t)+\Delta]$ which are applied to a regeneration circuit 15 appear at the output of low-pass filter 11, 12. The regeneration circuit 15 comprises two A/D converters 16, 17, which sample the demodulated signal and convert the sampled analog value into a digital value. The A/D converters 16, 17 are controlled by a reference clock signal which is regenerated from the demodulated signals by clock regenerator 18. The reference clock signal has a frequency which is equal to the symbol rate $1/(T)$. In a combination circuit 19, there is determined, with the digital value obtained, the associated digital value of the instantaneous phase $[\phi(t)+\Delta.]$ This combination circuit may be in the form of a read-only memory (ROM) in which the sign and cosine values and the associated arguments are stored in the form of a Table. To save storage capacity the table $\phi \rightarrow (\sin \phi, \cos \phi)$ is stored for one quadrant only. The signs are assigned separately. The unambiguous digital value thus determined of the phase $[\phi(t)+\Delta]$ is finally applied to a decision circuit 21 to obtain the original binary data signals, which are applied to a data signal sink 22 for further processing. In addition, the receiver comprises a delay circuit 23 connected to the output of the read-only memory 19 for delaying the analog value of the phase by zero, one and two symbol intervals 2T. The delayed versions of this phase is also applied to the decision circuit 21. The arrangement and operation of decision circuit 21 will be further described hereinafter.

Figure 4:
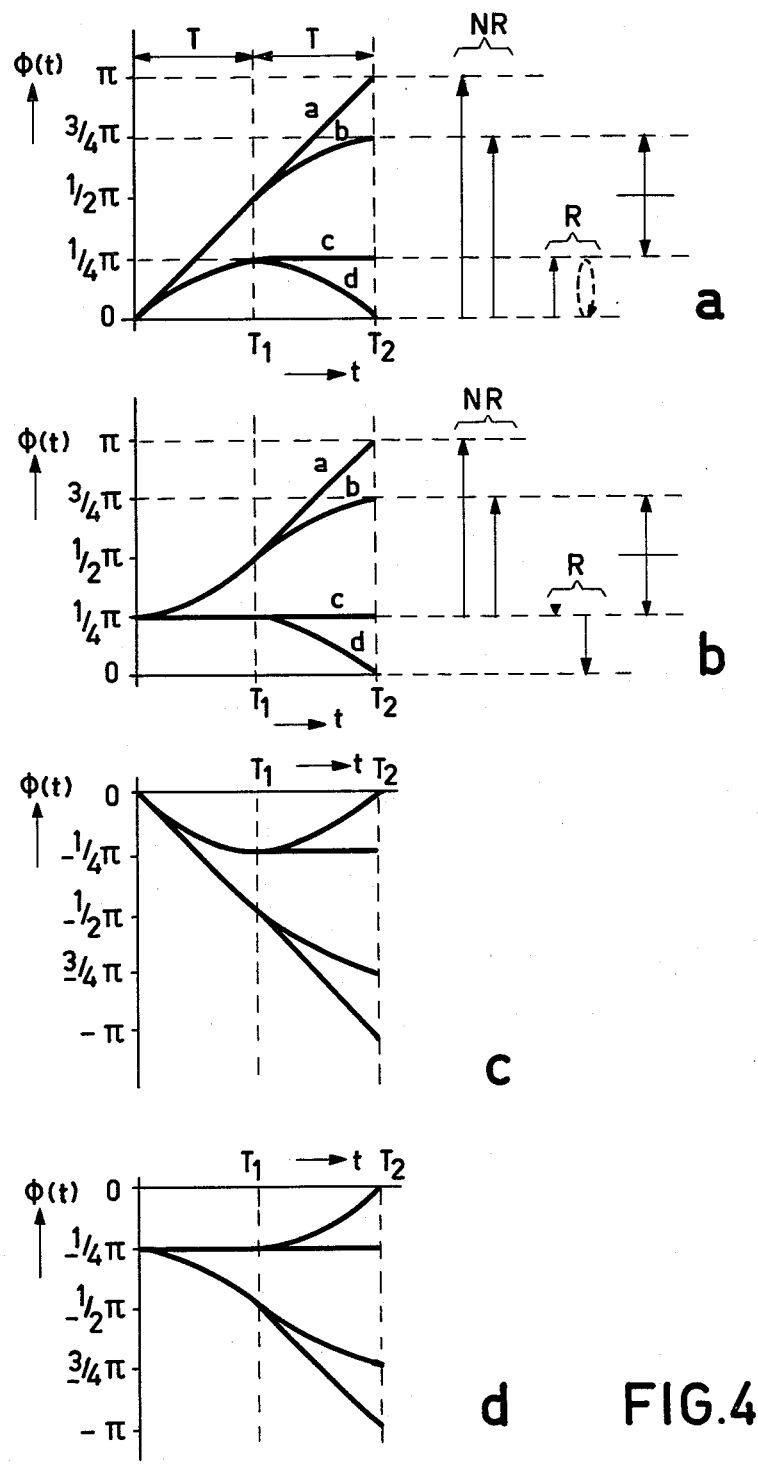
FIG. 4 shows some phase trajectories which are generated in the transmitter shown in FIG. 1 and are employed in the receiver shown in FIG. 3.

For the recovery of the original binary data signals, the phase change of $\phi(t)$ is considered in the receiver and more specifically in the decision circuit 21 during two symbol intervals. Actually, the decision circuit determines whether, during that period of a length of two symbol intervals, a bit change (01 or 10) or no bit change (00, 11) has taken place. This can be further described with reference to the possible phase trajectories during such a period of a length of two symbol intervals, which phase trajectories are shown in FIG. 4. FIG. 4a shows the possible phase trajectories (a, b, c, d) for the case in which a bit value 1 was transmitted in the first bit interval (the bit interval which ends at $T_1$) and no bit change has taken place in the receiving period, which has a length of two symbol intervals and ends at $T_1$, so that the phase at the beginning of the interval amounts to k $\pi/2$ rad. FIG. 4b shows the possible phase trajectories (a,b,c,d) for the case in which a bit value 1 was also transmitted in the first bit interval but a bit change has occurred in the preceding period which has a length of two symbol intervals and ends at $T_1$, so that the phase at the beginning of the interval amounts to $k\pi/2+\pi/4$ rad. The phase trajectories can be derived from the variation of the continuous phase $\phi(t)$ of the modulated signal such as it is shown in, for example, FIG. 2c.

From FIG. 4a it appears that trajectories a or b are passed through in the event that no bit change (NR) occurs in the instantaneous dibit (dibits are the pairs of bits which are coded in a period having a length of two symbol intervals). The minimum phase change then occurring amounts to $(3\pi/4)$ rad. The trajectories c or d are passed through in the event a bit change (indicated by R in FIG. 4) occurs in the instantaneous dibit. The maximum phase change then occurring amounts to $(\pi/4)$ rad. By adjusting a decision threshold at $(\pi/2)$ rad., a distinction can therefore be made between whether a bit change has occurred or not occurred in the instantaneous dibit. In that event, the noise margin amounts to $(\pi/4)$ rad. to either side.

For the phase trajectories shown in FIG. 4b the situation is somewhat different. The trajectories a and b are also passed through if no bit change occurs in the instantaneous dibit interval. Here however the minimum phase change is $(\pi/2)$ rad. The trajectories c and d are passed through if a bit change occurs. The maximum phase change is then however 0 rad. So for the phase trajectories shown in FIG. 4b, a decision threshold is required at approximately $(\pi/4)$ rad. In that case the noise margin also amounts to $(\pi/4)$ at either side of that threshold.

FIGS. 4a and 4b further show that the phase for the next dibit interval starts (at $T_1$) at $k\pi/2$ rad. when there is no bit change in the instantaneous interval, and at $k\pi/2+\pi/4$ rad. when a bit change occurs.

The two remaining possibilities for obtaining phase trajectories (bit value 0 in the first symbol interval) are shown in FIG. 4c and FIG. 4d. FIG. 4c is the mirror image of FIG. 4a. The minimum phase change then occurring is $-[(3\pi/4)]$ rad. when the trajectories a and b are passed through (no bit change) and the maximum phase change is $-[(3\pi/4)]$ rad. when the trajectories c and d are passed through (bit change). It is therefore advantageous to choose the decision threshold $-(\pi/2)$ rad.; on either side thereof there then occurs a margin of $(\pi/4)$ rad.

The phase trajectories in FIG. 4d are the mirror image of the trajectories shown in FIG. 4b. The phase trajectories a,b are passed through if no bit change occurs (minimum phase change $-(\pi/2)$ rad.), the phase trajectories c, d are passed through if a bit change occurs (maximum phase change 0 rad.). It is therefore advantageous to choose the decison threshold $-(\pi/4)$ rad. so that on either side an equally large margin of $(\pi/4)$ rad. is obtained.

FIGS. 4c and 4d further show that the phase for the next dibit interval starts (at T₁) at $k\pi/2$ rad. when no bit change occurs in the instantaneous interval and at $k\pi/2 + \pi/4$ rad. when a change does occur.

In the decision circuit 21 the phase difference between the end of a period having a length of two symbol intervals and the beginning thereof is compared with the decision threshold valid for that interval. Depending on the fact of whether the threshold is exceeded or fallen short of, a bit change or no bit change is detected. The next period having a length of two symbol intervals is always shifted by one period with respect to the period immediately preceding it: so consecutive intervals having a length of two symbols, overlap for exactly one symbol interval.

So the threshold for the next dibit must be set at $\pi/2$ rad. (a threshhold being set at the same time at $-\pi/2$ rad.) when for the duration of the instantaneous digit interval the decision no bit change is taken, as then the phase for the next interval starts at $k\pi/2$ rad.

The threshold for the next dibit interval must be set at $+\pi/4$ rad. or $-\pi/4$ rad. (thresholds being set at the same time at $-\pi/4$ rad. and $+3\pi/4$ rad., respectively) when a "bit change" is detected in the instantaneous dibit interval. The threshold becomes $+\pi/4$ rad. if the second bit of the instantaneous dibit interval is 1 and becomes $-\pi/4$ rad. if this bit is 0. However, for the instantaneous dibit value, it is only possible to detect that a bit change has indeed occurred, but it is not possible to ascertain whether this is 10 or 01 (see for example FIGS. 4a and b, trajectory c). The value of the second bit of the instantaneous dibit interval in which "bit change" was detected can however be derived from the sign of the phase change in the last dibit interval during which "no change" was detected, as there two bits of the same "polarity" occurred. The sign of the bits follows from the sign of the phase change. The sign of the second bit in the interval during which "change" is detected, now follows unambiguously from the sign of said bit and the number of bit intervals (even or odd) which have elapsed since then.

On the basis of the possible phase trajectories described above the decision criterion can be summarized as follows:

1. If, for the instantaneous dibit interval, no bit change (NR) is detected (so the phase trajectory is in accordance with one of the trajectories a or b of FIG. 4) then the decision threshold for the next dibit interval (which starts halfway the instantaneous dibit interval) is set at ((90/2) rad.). The sign of the phase change during the instantaneous dibit interval (positive or negative) is stored.

2. If, for the instantaneous dibit interval, a bit change (R) is detected (so the phase trajectory is in accordance with one of the trajectories c or d of FIG. 4) then the decision threshold for the next dibit interval is set at:
   (a) $+(\pi/4)$ rad. if the last dibit interval in which no bit change was detected, had a positive (negative) sign and the number of symbol intervals between the instantaneous dibit interval and said last interval is even (odd).
   (b) $-(\pi/4)$ rad. in the other cases.

The decision circuit 21 comprises a subtracting circuit 24, a comparator circuit 25 and a threshold control circuit 26. The subtracting circuit 24 is connected to the outputs of delay circuit 23 to determine the difference between the phase at the beginning and at the end of a period having a length of two bit intervals. This may be done by, as is assumed here, determining the phase change per bit interval and determining the value per dibit from the sum of two consecutive phase changes or directly from the phase change per dibit. The output of subtracting circuit 24 is connected to the input of comparator circuit 25. In comparator circuit 25, the phase difference determined by subtracting circuit 24 is compared with a threshold value which is set under the control of threshold control circuit 26. For that purpose both the input signal and the output signal of comparator circuit 25 are applied to the threshold control circuit 26.

What is claimed is:

1. A receiver for angle-modulated carrier signals, the receiver comprising an input circuit for deriving the transmitted angle-modulated carrier signal from a transmission channel, a reference carrier circuit, a demodulation circuit coupled to the input circuit for demodulating the transmitted angle-modulated carrier signal with the reference carriers for generating first and second demodulated signals, and a regeneration circuit for determining the instantaneous phase from said first and second demodulated signals, the receiver further comprising a decision circuit for producing regenerated binary data signals from the instantaneous phase, characterized in that the reference carrier circuit in the receiver comprises a carrier oscillator, the frequency of which is approximately equal to the frequency of the carrier oscillator of the transmitter, that the decision circuit in the receiver determines the phase difference between the end of a period, which is two symbol intervals long and has a length of 2T, and the beginning of a second period, which is two symbol intervals long and has a length 2T, that the decision circuit is arranged for generating a first logic value if the phase difference exceeds a decision threshold and for generating a second logic valve if the phase difference falls short of said decision threshold, that the decision threshold for a second dibit interval, which has a length of two symbol intervals and follows after a present dibit interval having a length of two symbol intervals, and beginning midway said present dibit interval, is equal to $(\pi/2)$ rad. if the first logic value is regenerated in the present dibit interval, that the decision threshold for the second dibit interval is equal to $(\pi/4)$ rad. if the second logic value was generated in the present dibit interval and, in a preceding dibit interval in which the first logic value was generated, the phase difference was positive (negative) and the number of symbol intervals between said preceding dibit interval and the present dibit interval is even (odd), and that the decision threshold for the second dibit interval is $-(\pi/4)$ rad. for the remaining cases in which the phase difference was negative and the number of symbol intervals is even, or vice versa.

2. A receiver for angle-modulated carrier signals as claimed in claim 1, characterized in that the receiver further comprises a clock regenerator and the regeneration circuit comprises means for sampling and converting the first and the second demodulated signals into a first and a second digital value under the control of the clock regenerator, and a digital read-only memory wherein the possible digital values the demodulated signals may assume are stored in address memory locations and the phase angle corresponding with said digital values are stored in the associated memory locations, the read-only memory being addressed by the first and the second digital value in order to provide the phase angle.

3. A receiver for angle-modulated carrier signals as claimed in claim 1 or claim 2, characterized in that the decision circuit comprises a subtracting circuit, a comparator circuit and a threshold control circuit, an output of the subtracting circuit being connected to a first input of the comparator circuit for comparison with a threshold value, the output of the subtracting circuit further being connected to a first input of the threshold control circuit; an output of the comparator circuit being connected to a second input of the threshold control circuit, an output of said threshold control circuit being connected to a second input of the comparator circuit for setting said threshold value, the output of the comparator circuit being the output of the decision circuit, and the threshold control circuit being controlled by the clock regenerator.

* * * * *